United States Patent [19]
Kaminow et al.

[11] Patent Number: 5,623,356
[45] Date of Patent: Apr. 22, 1997

[54] COMBINED WAVELENGTH ROUTER AND SWITCH APPARATUS FOR USE IN A WAVELENGTH DIVISION MULTIPLEXED OPTICAL COMMUNICATION SYSTEM

[75] Inventors: Ivan P. Kaminow, Holmdel; Hisashi Kobayashi, Princeton, both of N.J.

[73] Assignee: Lucent Technologies Inc., Murray Hill, N.J.

[21] Appl. No.: 386,239

[22] Filed: Feb. 9, 1995

[51] Int. Cl.$^6$ ................................................. H04J 14/00
[52] U.S. Cl. ...................... 359/123; 359/117; 359/128; 359/139
[58] Field of Search ......................... 359/123, 128, 359/117, 139

[56] References Cited

U.S. PATENT DOCUMENTS

| | | | |
|---|---|---|---|
| 4,654,889 | 3/1987 | Shutterly | 359/121 |
| 5,005,166 | 4/1991 | Suzuki | 359/123 |
| 5,194,977 | 3/1993 | Nishio | 359/123 |
| 5,351,146 | 9/1994 | Chan | 359/123 |
| 5,394,489 | 2/1995 | Koch | 359/127 |

FOREIGN PATENT DOCUMENTS

| | | | |
|---|---|---|---|
| 0096893 | 5/1986 | Japan | 359/123 |
| 0248347 | 9/1987 | Japan | 359/123 |
| 0050194 | 3/1988 | Japan | 359/123 |
| 0013900 | 1/1989 | Japan | 359/123 |

OTHER PUBLICATIONS

Alexander, S.B., et al., "A Precompetitive Consortium on Wide–Band All–Optical Networks," *Journal of Lightwave Technology*, vol. 11, No. 5/6, May/Jun. 1993, pp. 714–735.

Dragone, C., "An NxN Optical Multiplexer Using a Planar Arrangement of Two Star Couplers," *IEEE Photonics Technology Letters*, vol. 3, No. 9, Sep. 1991, pp. 812–815.

Glance, B., et al., "Applications of the Integrated Waveguide Grating Router," *Journal of Lightwave Technology*, vol. 12, No. 6, Jun. 1994, pp. 957–962.

Glance, B., et al., "High Performance Optical Wavelength Shifter," *Electronics Letters*, vol. 28, No. 18, Aug. 27, 1992, pp. 1714–1715.

Perino, J.S., et al., "Fibre Transmission of 10Gbit/s Signals Following Wavelength Conversion Using a Travelling-wave Semiconductor Optical Amplifier," Reprinted from *Electronics Letters*, vol. 30, No. 3, Feb. 3, 1994, pp. 256–257.

Wiesenfeld, J.M., and Glance, B., "Cascadability and Fanout of Semiconductor Optical Amplifier Wavelength Shifter," *IEEE Photonics Technology Letters*, vol. 4, No. 10, Oct. 1992, pp. 1168–1171.

Primary Examiner—Leslie Pascal

[57] ABSTRACT

A combined wavelength router and switch apparatus for use in an optical communication system is disclosed. The apparatus includes arrays of optical signal demultiplexers, wavelength division switches, space division switches and multiplexers, arranged in a manner that can increase the connectivity of an optical system using wavelength division multiplexed (WDM) signals. In several embodiments, time-multiplexed wavelength division switches and time-multiplexed space division switches may be used to increase further the degree of connectivity of the system or to reduce the number of wavelength division switches and space division switches required. Additional arrays of wavelength division switches or time-multiplexed wavelength division switches may be included to allow carrier frequencies to be shifted to meet the channel ordering requirements of the optical system.

31 Claims, 7 Drawing Sheets

COMBINED WAVELENGTH ROUTER AND SWITCH APPARATUS FOR USE IN A WAVELENGTH DIVISION MULTIPLEXED OPTICAL COMMUNICATION SYSTEM

FIELD OF THE INVENTION

The present invention relates generally to optical communication systems, and, in particular, to a combined wavelength router and switch apparatus which can increase the degree of connectivity in a wavelength division multiplexed (WDM) optical communication system.

BACKGROUND OF THE INVENTION

All-optical networks are emerging as the next generation of broadband networks for both wide area and local area networks. Despite the enormous bandwidth that optical channels can provide, however, their capacity may be limited by a number of factors. The capacity of optical networks based upon wavelength division multiplexing (WDM) and wavelength routing, for example, is limited by the tuning range of the optical lasers. Although wavelength reuse of the available optical bandwidth can increase the capacity of such networks, it remains desirable to increase the degree of connectivity in such networks so as to exploit as much of the available optical bandwidth as possible. In particular, it is desirable to allow an optical signal using an arbitrary carrier frequency and being transmitted along one transmission line to be switched to a different carrier frequency and transmitted along another optical transmission line.

SUMMARY OF THE INVENTION

The present invention discloses a combined wavelength router and switch apparatus ("router/switch") for use in an optical communication system. The wavelength router/switch includes arrays of optical signal demultiplexers, wavelength division switches, space division switches and multiplexers, arranged in a manner that can increase the connectivity of an optical system using wavelength division multiplexed (WDM) signals.

In one embodiment of the present invention, the wavelength router/switch includes an array of N optical signal wavelength-domain or wavelength-sensitive demultiplexers each of which includes an input and a set of F output ports. Optical signals may be carried, for example, along optical links. The wavelength router/switch also includes an array of N optical signal wavelength division switches, each of which is coupled optically to a respective one of the sets of F output ports and each of which includes a set of F' output ports. The wavelength division switches preferably shift the frequency or wavelength of optical carrier signals while maintaining the data modulation of the original signals. The router/switch of the present invention also preferably includes an array of F' optical signal space division switches, each of which is coupled optically to a respective one of the set of F' output ports from each of the N optical signal wavelength division switches, and each of which includes a set of N' output ports. Finally, the router/switch preferably includes an array of N' optical signal wavelength-domain multiplexers, each of which is coupled optically to a respective one of the set of N' output ports from each of the F' optical signal space division switches, and each of which includes an output.

In another embodiment of the present invention, a second array of optical signal wavelength division switches may be added to allow carrier frequencies to be shifted to meet the channel ordering requirements of an optical fiber system.

In yet additional embodiments, the present invention may be extended to situations where information is carried by a combination of wavelength division multiplexed (WDM) and time division multiplexed (TDM) signals. By replacing the arrays of wavelength division switches with time-multiplexed wavelength division switches and by replacing the arrays of space division switches with time-multiplexed space division switches, the number of required space division switches and wavelength division switches may be reduced and the degree of connectivity of the wavelength router/switch may be increased even further.

Other features and advantages of the present invention will be readily apparent by reference to the following detailed description and accompanying drawings.

DETAILED DESCRIPTION

Figure 1:
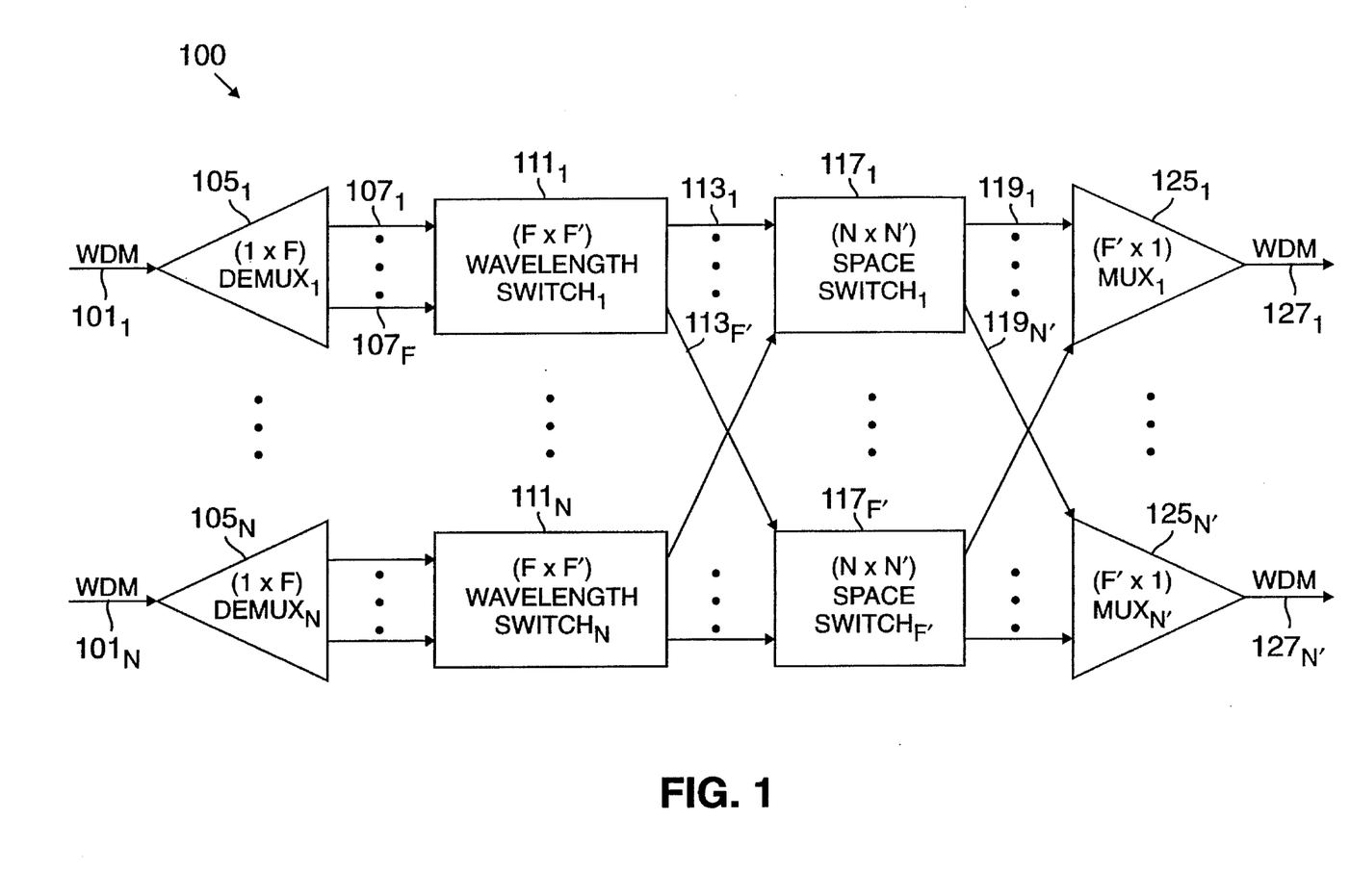
FIG. 1 is a block diagram showing one embodiment of a wavelength router/switch according to the principles of the present invention.

FIG. 1 is a block diagram showing one embodiment of a combined wavelength router and switch ("router/switch") 100 according to the principles of the present invention. FIG. 1 shows an array of N optical links, $101_1$ through $101_N$, each of which may carry a plurality of optical carrier frequencies which may be modulated by a data signal. In a preferred use of the invention, the plurality of optical carrier frequencies are equi-spaced. The plurality of optical carrier frequencies corresponds to a plurality of optical carrier wavelengths. Each of the optical links, such as the link $101_1$, thus may carry a wavelength division multiplexed (WDM) signal, also known as a frequency division multiplexed (FDM) signal. The number of optical carrier frequencies, and corresponding wavelengths, may be designated F, and the set of optical carrier frequencies may be designated by $f_1, f_2, \ldots, f_F$.

Each of the links $101_1$ through $101_N$ is coupled optically to a respective one of an array of N optical signal wavelength-domain demultiplexers, $105_1$ through $105_N$. The optical link $101_1$, for example, is coupled to the wavelength-domain demultiplexer $105_1$. Each of the demultiplexers, $105_1$ through $105_N$, preferably splits the WDM signal received at its input into the respective frequency components of the WDM signal and includes F output ports. The demultiplexer $105_1$, for example, includes F output ports, $107_1$ through $107_F$, each of which may receive one of the modulated frequency, or wavelength, carrier signals included in the WDM signal provided at the input to the demultiplexer $105_1$.

The wavelength router/switch 100 also has an array of N optical signal wavelength division switches or frequency changers, $111_1$ through $111_N$, corresponding to the array of demultiplexers, $105_1$ through $105_N$. Each of the F output ports of each of the demultiplexers, $105_1$ through $105_N$, is coupled optically and serves as an input to a corresponding one of the wavelength switches, $111_1$ through $111_N$. In particular, each of the wavelength switches, $111_1$ through $111_N$, is coupled optically to a respective set of F outputs from one of the demultiplexers $105_1$ through $105_N$. Thus, for example, the outputs $107_1$ through $107_F$ from the demultiplexer $105_1$ are coupled optically and serve as inputs to the wavelength switch $111_1$, as shown in FIG. 1. Each of the wavelength switches, $111_1$ through $111_N$, shifts the frequency or wavelength of the carrier signals it receives while maintaining the data modulation of the original signals. Furthermore, each of the wavelength switches, $111_1$ through $111_N$, which includes F' outputs, may then provide modulated wavelength-shifted or frequency-shifted carrier signals at its F' outputs. Thus, for example, the wavelength switch $111_1$ includes F' output ports, $113_1$ through $113_{F'}$, where F' may be different from F. In one embodiment, the wavelength-shifted carrier signals at the outputs $113_1$ through $113_{F'}$, for example, may simply be a permutation of the original set of F carrier wavelengths received from the outputs $107_1$ through $107_F$ of the demultiplexer $105_1$. In general, however, the F' possible wavelength-shifted carrier signals at the outputs $113_1$ through $113_{F'}$, for example, may comprise a set of frequencies, $f'_1, f'_2 \ldots f'_{F'}$, different from the original set of carrier frequencies.

The wavelength router/switch 100 further includes an array of F' optical signal space division switches, $117_1$ through $117_{F'}$. Each of the space division switches, $117_1$ through $117_{F'}$, preferably is coupled optically to a respective one of the F' output ports from each of the N wavelength switches, $111_1$ through $111_N$. More specifically, the outputs from the wavelength switches, $111_1$ through $111_N$, that use a common one of the F' carrier frequencies or carrier wavelengths, preferably are coupled to the same one of the space switches, $117_1$ through $117_{F'}$. Each of the space division switches, $117_1$ through $117_{F'}$, then preferably routes each of the input signals it receives to a respective one of N' output ports. The space switch $117_1$, for example, would route each optical signal it receives to a respective one of N' output ports, $119_1$ through $119_{N'}$.

Each of the N' output ports from each of the space switches, $117_1$ through $117_{F'}$, is coupled optically to one of an array of N' optical signal wavelength-domain multiplexers, $125_1$ through $125_{N'}$. In particular, each of the multiplexers, $125_1$ through $125_{N'}$, is coupled to a respective one of the N' output ports from each of the space switches, $117_1$ through $117_{F'}$. Each of the optical multiplexers, $125_1$ through $125_{N'}$, may thus receive an optical signal from each of the space switches, $117_1$ through $117_{F'}$. The output of each of the multiplexers, $125_1$ through $125_{N'}$, would be a wavelength division multiplexed (WDM) signal which may be transmitted along a respective optical link, such as link $127_1$ coupled to the multiplexer $125_1$ through optical link $127_{N'}$ coupled to the multiplexer $125_{N'}$.

Each of the space switches, $117_1$ through $117_{F'}$, may comprise, for example, a plurality of lithium niobate, $LiNbO_3$, spatial switching elements interconnected as a multi-stage network. Each of the multiplexers, $125_1$ through $125_{N'}$, may be implemented, for example, by using optical star couplers. Alternatively, they may be implemented by using a wavelength-domain multiplexer, which may be accomplished by inverting a wavelength-domain demultiplexer, such as the demultiplexer $105_1$. The different components of the wavelength router/switch 100 may be optically coupled, for example, by optical fibers or any other suitable optical link.

One advantage of the present invention is that the degree of connectivity of the wavelength router/switch 100 is increased, relative to a simple waveguide grating router or a spatial switch alone. The degree of connectivity of the wavelength router/switch 100 may be expressed as (N×N'× F×F'), where N and N' represent the number of input links, $101_1$ through $101_N$, and output links, $127_1$ through $127_{N'}$, respectively, and where F and F' represent the respective numbers of optical carrier frequencies or wavelengths, as indicated above. It should be noted, however, that the maximum number of simultaneous connections is given by the smaller of (N×F) and (N'×F').

Figure 2:
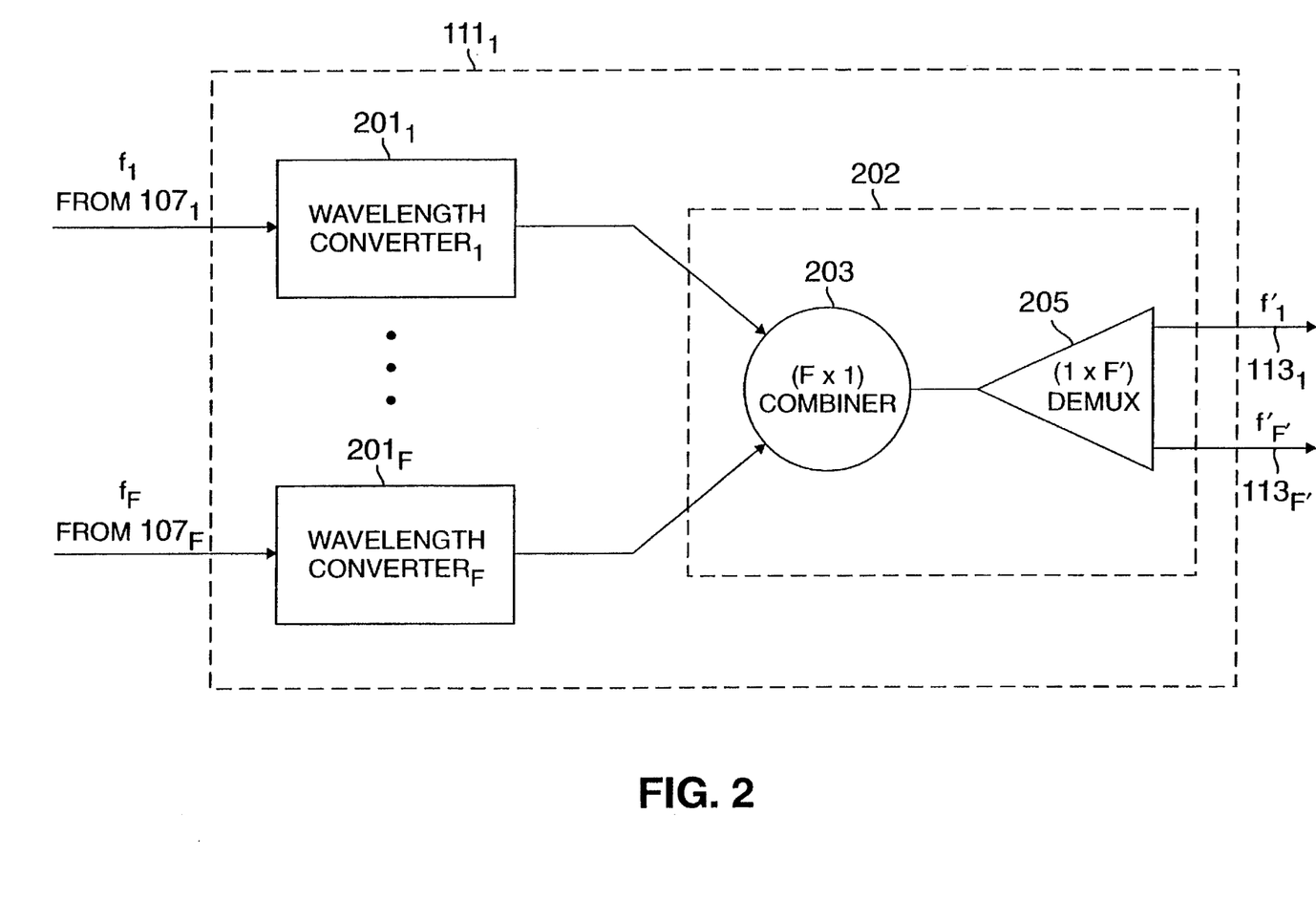
FIG. 2 is a more detailed block diagram of one suitable embodiment of one of the wavelength division switches in FIG. 1.

FIG. 2 is a more detailed block diagram of one suitable embodiment of one of the wavelength switches, $111_1$ through $111_N$, such as the wavelength switch $111_1$. Each of the F outputs, $107_1$ through $107_F$, from the demultiplexer $105_1$ preferably is coupled optically and serves as an input to a respective one of an array of F wavelength converters, $201_1$ through $201_F$. Wavelength converters are also known in the art as frequency translators or wavelength shifters. The output port $107_1$, at which the $f_1$ component of the WDM signal from the link $101_1$ appears, may be coupled, for example, to the wavelength converter $201_1$ as shown in FIG. 2. Similarly, the output port $107_F$, at which the $f_F$ component of the WDM signal from the link $101_1$ appears, may be coupled, for example, to the wavelength converter $201_F$. Several designs for achieving optical signal frequency translation are known in the art and are suitable for use in the present invention. One wavelength conversion technique which may be used in the present invention is described in the article "High Performance Optical Wavelength Shifter," Electronics Letters, Vol. 28, No. 18, August 1992, pp. 1714–1715, by Glance et al., which is incorporated by reference herein.

The outputs from the F wavelength converters, $201_1$ through $201_F$, are then coupled optically to a wavelength router 202 arranged such that the set of F' possible carrier frequencies at the outputs $113_1$ through $113_{F'}$, appear in a specified order and at specified output ports. The router 202 may comprise, for example, a combiner 203, such as an optical star coupler, the output of which is coupled to a grating-based optical demultiplexer 205.

Figure 3:
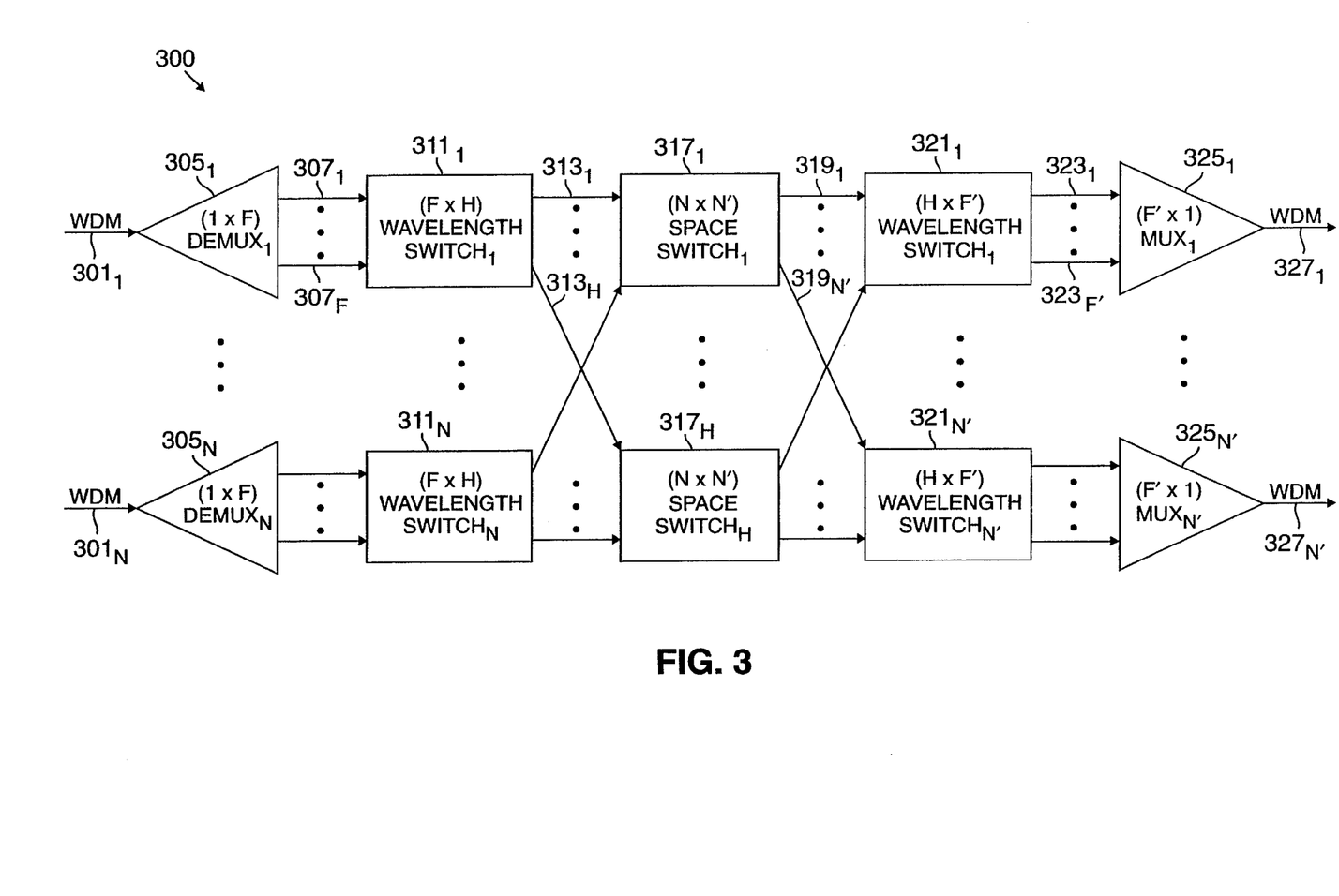
FIG. 3 is a block diagram showing a second embodiment of a wavelength router/switch according to the principles of the present invention.

FIG. 3 is a block diagram showing a second embodiment of an optical signal wavelength router/switch 300 according to the principles of the present invention. This second embodiment is similar to the first embodiment shown in FIG. 1, with the addition of a second array of optical signal wavelength division switches connected between the array of space switches and the array of optical signal wavelength-domain multiplexers. The addition of the second array of wavelength switches may be necessary to meet the channel carrier-frequency ordering requirements of the optical system.

Specifically, with reference to FIG. 3, the wavelength router/switch 300 may include an array of optical links, $301_1$ through $301_N$, each of which may carry a WDM signal and which is connected to a respective one of an array of N optical signal wavelength-domain demultiplexers, $305_1$ through $305_N$. Each of the demultiplexers, $305_1$ through $305_N$, preferably splits the WDM signal received at its input into the respective frequency or wavelength components of the WDM signal and includes F output ports. Thus, for example, the demultiplexer $305_1$ includes the output ports, $307_1$ through $307_F$.

The wavelength router/switch of FIG. 3 also includes an array of N optical signal wavelength division switches, $311_1$ through $311_N$, corresponding to the array of demultiplexers, $305_1$ through $305_N$. The output ports of each of the demultiplexers, $305_1$ through $305_N$, are coupled optically and serve as inputs to a corresponding one of the wavelength switches, $311_1$ through $311_N$. For this purpose, each of the wavelength switches, $311_1$ through $311_N$, is coupled to a respective set of F outputs from one of the demultiplexers, $305_1$ through $305_N$. Thus, for example, the output ports, $307_1$ through $307_F$, of the demultiplexer $305_1$ are coupled to the wavelength switch $311_1$ as shown in FIG. 3. Each of the wavelength switches, $311_1$ through $311_N$, may be implemented in the same manner as the wavelength switch $111_1$ shown in FIG. 2 with H replacing F'. Each of the wavelength switches, $311_1$ through $311_N$, thus includes H output ports. The wavelength switch $311_1$, for example, includes H output ports, $313_1$ through $313_H$, each of which corresponds to one of H shifted wavelengths or frequencies.

The wavelength router/switch of FIG. 3 further includes an array of H space division switches, $317_1$ through $317_H$. Each of the space switches, $317_1$ through $317_H$, preferably is coupled optically to a respective one of the outputs from each of the wavelength switches, $311_1$ through $311_N$. More specifically, the outputs from the wavelength switches, $311_1$ through $311_N$, that are using a common one of the H carrier frequencies or carrier wavelengths, preferably are coupled to the same one of the space division switches, $317_1$ through $317_H$. Each of the space division switches, $317_1$ through $317_H$, may comprise, for example, a plurality of $LiNbO_3$ spatial switching elements interconnected as a multi-stage network.

Each of the space division switches, $317_1$ through $317_H$, preferably routes each of the input signals it receives to a respective one of N' output ports. The space switch $317_1$, for example, routes each optical signal it receives to a respective one of N' output ports, $319_1$ through $319_{N'}$. Each of the N' output ports from each of the space switches, $317_1$ through $317_H$, preferably is coupled optically to one of a second array of N' optical signal wavelength division switches, $321_1$ through $321_{N'}$. In particular, each of the wavelength switches, $321_1$ through $321_{N'}$, is coupled to a respective one of the N' output ports from each of the space switches, $317_1$ through $317_H$. Thus, each of the wavelength switches, $321_1$ through $321_{N'}$, may receive an optical signal from each of the H space switches, $317_1$ through $317_H$.

Each of the wavelength switches, $321_1$ through $321_{N'}$, shifts the frequency or wavelength of the carrier signals it receives to one of F' possible wavelengths while maintaining the data modulation of the original signals. Each of the wavelength switches, $321_1$ through $321_{N'}$, includes F' output ports and may be implemented in a manner similar to the wavelength switch $111_1$ in FIG. 2, with F replaced by H. The wavelength switch $321_1$, for example, includes F' output ports, $323_1$ through $323_{F'}$. Each of F, F' and H may be different from one another. It should be noted, however, that it is desirable to choose a large H to avoid blocking. In particular, the wavelength router/switch 300 is nonblocking if H is equal to or greater than (F+F'−1).

Each of the F' outputs from any one of the wavelength switches, $321_1$ through $321_{N'}$, is coupled optically to the same respective one of an array of N' optical signal wavelength-domain multiplexers, $325_1$ through $325_{N'}$. Thus, for example, the output ports, $323_1$ through $323_{F'}$, of the wavelength switch $321_1$ are coupled to the multiplexer $325_1$, so that the multiplexer may receive an optical signal in each of the F' carrier frequencies. The output of each of the multiplexers, $325_1$ through $325_{N'}$, would be a wavelength division multiplexed (WDM) signal and may be transmitted along a respective optical link, such as link $327_1$ connected to the output of the multiplexer $325_1$ through link $327_{N'}$ connected to the multiplexer $325_{N'}$. As indicated above, the addition of the second array of wavelength switches allows the carrier frequencies or wavelengths to be shifted to meet the channel ordering requirements of the output links.

Although the above embodiments are described with reference to the use of WDM signals, the present invention may also be extended to situations where information is carried by a combination of wavelength division multiplexed (WDM) and time division multiplexed (TDM) signals. If, for example, the signals that are carried on the input links, $101_1$ through $101_N$ or $301_1$ through $301_N$, are WDM signals which are time-slotted, then the degree of connectivity increases to (N×N'×F×F'×T), where T is a positive integer and represents the number of different time slots.

Figure 4:
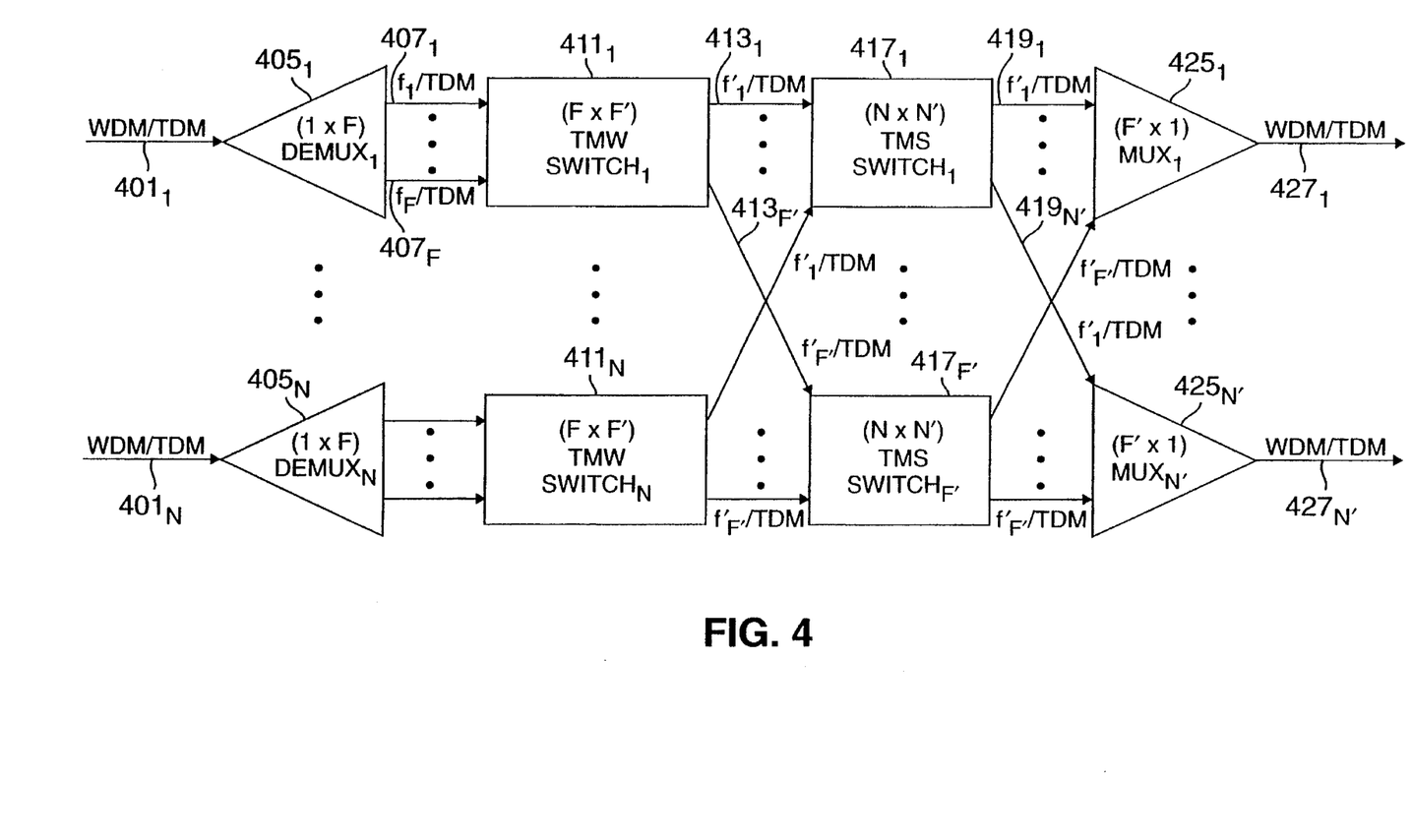
FIG. 4 is a block diagram showing yet a further embodiment of a wavelength router/switch according to the principles of the present invention.

The number of required space division switches and wavelength division switches can be reduced by using optical signal time-multiplexed space division (TMS) switches, in which the connection patterns can be changed for different time slots, and by using optical signal time-multiplexed wavelength division (TMW) switches, in which a wavelength switch can tune to different frequencies or wavelengths during different time slots. As shown in FIG. 4, for example, an array of (F×F') TMW switches, $411_1$ through $411_N$, may replace the array of wavelength switches, $111_1$ through $111_N$, in FIG. 1, and an array of (N×N') TMS switches, $417_1$ through $417_F$, may replace the array of space division switches, $117_1$ through $117_F$, in FIG. 1.

With further reference to FIG. 4, an array of optical links, $401_1$ through $401_N$, each of which is suitable for carrying optical signals that are mutliplexed in time as well as in wavelength ("WDM/TDM" signal), is coupled optically to a respective array of N optical signal wavelength-domain demultiplexers, $405_1$ through $405_N$. The optical link $401_1$, for example, is coupled to the wavelength-domain demultiplexer $405_1$. Each of the demultiplexers, $405_1$ through $405_N$, preferably splits the WDM/TDM signal received at its input into the respective frequency or wavelength components of the WDM/TDM signal and includes F output ports. The demultiplexer $405_1$, for example, includes F output ports, $407_1$ through $407_F$.

The wavelength router/switch of FIG. 4 also includes an array of N optical signal TMW switches, $411_1$ through $411_N$, corresponding to the array of demultiplexers, $405_1$ through $405_N$. The outputs of each of the demultiplexers, $405_1$ through $405_N$, are coupled optically and serve as inputs to one of the corresponding wavelength switches, $411_1$ through $411_N$. Specifically, each of the wavelength switches, $411_1$ through $411_N$, is coupled to a respective set of F outputs from one of the demultiplexers, $405_1$ through $405_N$. Thus, for example, the output ports $407_1$ through $407_F$ of the demultiplexer $405_1$ are coupled and may serve as inputs to the wavelength switch $411_1$ as shown in FIG. 4.

Figure 5:
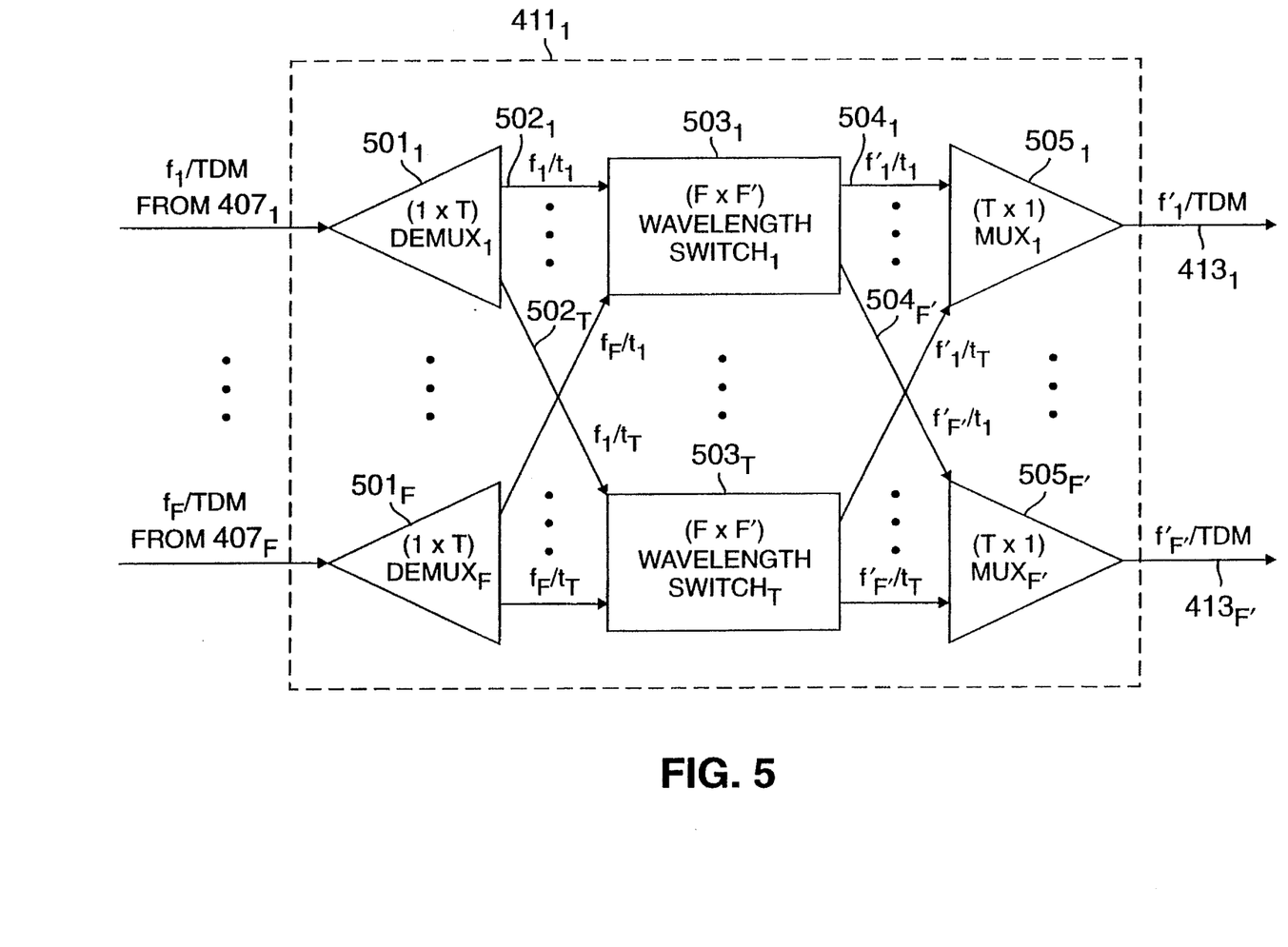
FIG. 5 is a block diagram showing a functional representation of a time-multiplexed wavelength division (TMW) switch for use in the wavelength router/switch of FIG. 4.

FIG. 5 is a block diagram showing a functional representation of an optical signal time-multiplexed wavelength division (TMW) switch, such as the TMW switch $411_1$, for use in the wavelength router/switch of FIG. 4. If the optical signal on the link $401_1$ of FIG. 4, for example, is multiplexed in time as well as wavelength ("WDM/TDM signal"), then the signals appearing at the output ports, $407_1$ through $407_F$, of the wavelength-domain demultiplexer $405_1$ are TDM signals, each time-slot using, for example, a different one of the F carrier frequencies or wavelengths. These TDM signals are shown at the far left-hand side of FIG. 5 and are coupled to a respective array of F optical signal time-domain demultiplexers, $501_1$ through $501_F$. Each of the time-domain demultiplexers, $501_1$ through $501_F$, includes T output ports. The demultiplexer $501_1$, for example, includes T output ports, $502_1$ through $502_T$. The signals at the T output ports correspond to the signals using a specified one of the F carrier frequencies and appearing in the T time slots, where the set of time slots may be designated $t_1, t_2, \ldots t_T$. Thus, for example, a signal using the frequency $f_1$ in the time slot $t_1$ would appear at the output port $502_1$, and a signal using the frequency $f_1$ in the time slot $t_T$ would appear at the output port $502_T$. It should be understood that the output ports $502_1$ through $502_T$ may be implemented as a single time-shared port.

The TMW switch of FIG. 5 also includes an array of T optical signal wavelength division switches, $503_1$ through $503_T$. Each of the wavelength switches, $503_1$ through $503_T$, would then receive each of the signals occurring in a particular time slot. For this purpose, each of the wavelength switches, $503_1$ through $503_T$, is coupled optically to a respective one of the T outputs from each of the F time-domain demultiplexers, $501_1$ through $501_F$. Furthermore, each of the wavelength switches, $503_1$ through $503_T$, is functionally equivalent to the wavelength switch $111_1$ shown in FIG. 2, and shifts the frequency or wavelength of the carrier signals to one of the F' possible wavelength-shifted carrier signals, $f'_1, f'_2, \ldots f'_{F'}$. As before, the data modulation of the original signals is maintained. Thus, for example, as shown in FIG. 5, the wavelength switch $503_1$ includes F' output ports, $504_1$ through $504_{F'}$. A signal using the frequency $f'_1$ in the time slot $t_1$ would appear, for example, at the output port $504_1$, and a signal using the frequency $f'_{F'}$ in the time slot $t_1$ would appear at the output port $504_{F'}$. Again, it should be understood that the wavelength division switches, $503_1$ through $503_T$ may be implemented as a single time-shared switch whose connection patterns can be changed for different time slots.

Each of the F' output ports of one of the wavelength switches, $503_1$ through $503_T$, is coupled to a respective one of F' optical signal time-domain multiplexers, $505_1$ through $505_{F'}$. Each of the time-domain multiplexers, $505_1$ through $505_{F'}$, may thus receive optical signals using a specified carrier frequency or wavelength in each of the T time slots. The output of each of the multiplexers, $505_1$ through $505_{F'}$, would be a time division multiplexed (TDM) signal using a specified carrier frequency or wavelength and appears at a corresponding one of F' output ports, $413_1$ through $413_{F'}$. The optical signal appearing at the output port $413_1$, for example, would be a TDM signal using the frequency $f'_1$.

As discussed above, FIG. 5 is a functional representation of one of the TMW switches $411_1$ through $411_N$. The switch shown in FIG. 5, however, may also be a suitable embodiment of each of the switches $411_1$ through $411_N$. Each of the wavelength switches, $503_1$ through $503_T$, may then be implemented by the wavelength switch $111_1$ as shown in FIG. 2. Although such an embodiment would not reduce the number of wavelength division switches required, it would allow time division multiplexed signals to be used in the system, as described above.

As shown in FIG. 4, the array of TMS switches, $417_1$ through $417_{F'}$, may be coupled to the output ports of the array of TMW switches, $411_1$ through $411_N$, in a manner analogous to the manner in which the array of space switches, $117_1$ through $117_F$, is coupled to the output ports of the array of wavelength switches, $111_1$ through $111_N$ in FIG. 1. Specifically, each of the TMS switches, $417_1$ through $417_{F'}$, preferably is coupled to a respective one of the F' outputs from each of the TMW switches, $411_1$ through $411_N$. The outputs from the TMW switches, $411_1$ through $411_N$, that are using a common one of the F' carrier frequencies or carrier wavelengths, preferably are coupled to the same one of the TMS switches, $417_1$ through $417_{F'}$.

Figure 6:
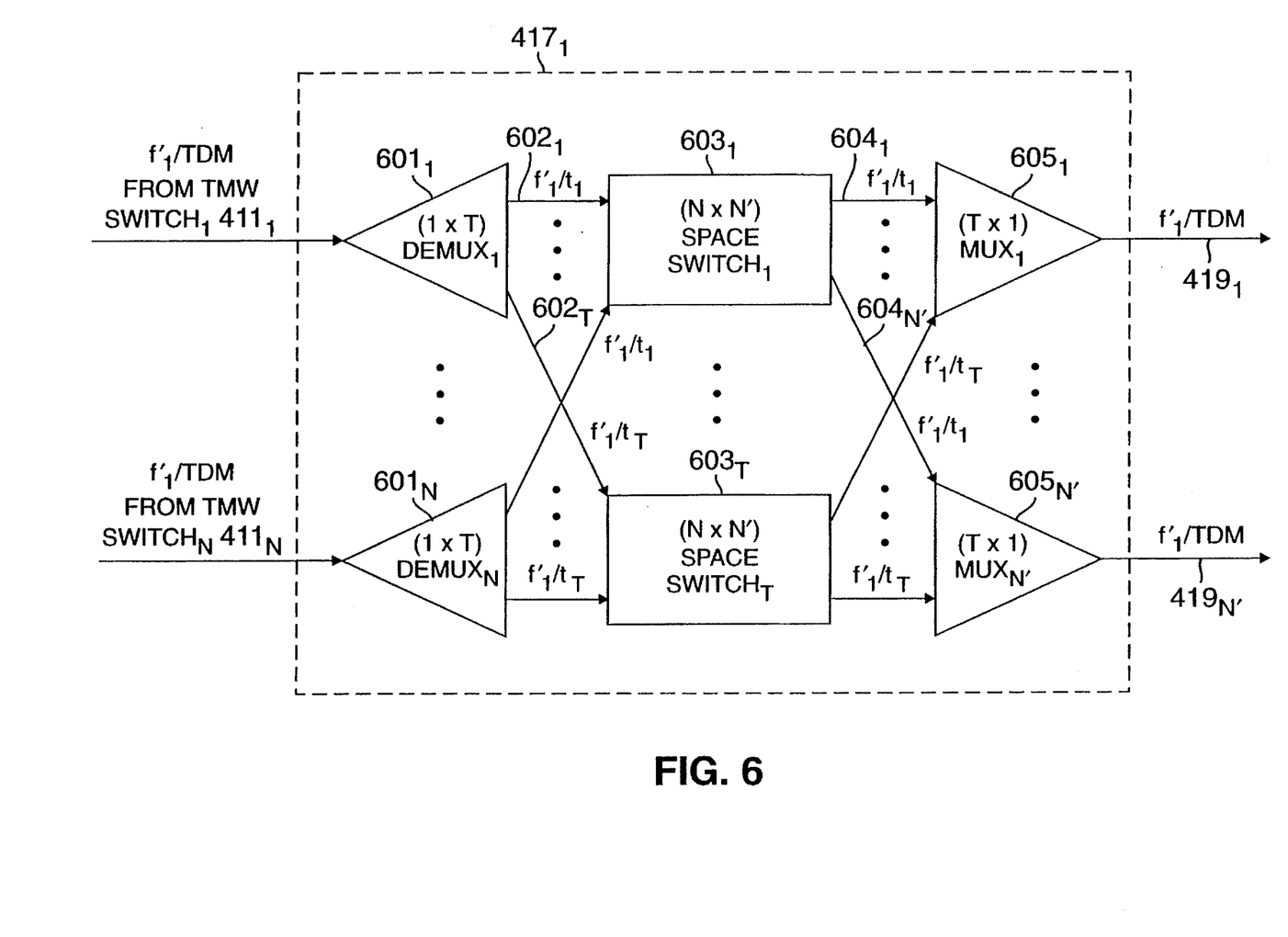
FIG. 6 is a block diagram showing a functional representation of a time-multiplexed space division (TMS) switch for use in the wavelength router/switch of FIG. 4.

FIG. 6 is a block diagram showing a functional representation of an optical signal time-multiplexed space division (TMS) switch, such as the TMS switch $417_1$, for use in the wavelength router/switch of FIG. 4. As explained above, the TMS switch $417_1$ may receive a TDM signal from each of the TMW switches, $411_1$ through $411_N$, where the TDM signals received by the TMS switch $417_1$ are each using the same frequency carrier, for example, $f'_1$. The TMS switch $417_1$ includes an array of N optical signal time-domain demultiplexers, $601_1$ through $601_N$, each of which may receive as its input one of the TDM signals received by the TMS switch $417_1$. Each of the time-domain demultiplexers, $601_1$ through $601_N$, preferably splits the TDM signal it receives into T signals, corresponding to the signals in each of the T time slots, and includes T output ports. The demultiplexer $601_1$, for example, includes T output ports, $602_1$ through $602_T$. It should be understood, however, that the ports $602_1$ through $602_T$ may be implemented as a single time-shared port.

The TMS switch $417_1$ also includes T optical signal space division switches, $603_1$ through $603_T$, each of which is coupled optically to a respective one of the outputs from each of the demultiplexers, $601_1$ through $601_N$, so as preferably to receive the signals using the specified carrier frequency and occurring in a specified time slot. Thus, for example, the space division switch $603_1$ would receive the signals using the carrier frequency $f'_1$ and occurring during the time slot $t_1$. Similarly, the space switch $603_T$, for example, may receive the signals using the carrier frequency $f'_1$ and occurring during the time slot $t_T$. Again, it should be understood that the space switches $603_1$ through $603_T$ may be implemented as a single space division switch whose connection patterns change for different time slots.

Each of the space division switches, $603_1$ through $603_T$, includes N' output ports. The space switch $603_1$, for example, includes N' output ports, $604_1$ through $604_{N'}$. Finally, the TMS switch $417_1$ includes an array of N optical signal time-domain multiplexers, $605_1$ through $605_{N'}$. Each of the outputs from the space switches, $603_1$ through $603_T$, is coupled optically to one of the multiplexers, $605_1$ through $605_{N'}$. In particular, each of the multiplexers, $605_1$ through $605_{N'}$, is coupled to a respective one of the N' outputs from each of the space switches, $603_1$ through $603_T$. Thus, each of the time-domain multiplexers, $605_1$ through $605_{N'}$, may receive an optical signal using a specified carrier frequency from each of the space switches, $603_1$ through $603_T$. The output of each of the multiplexers, $605_1$ through $605_{N'}$, would be a time division multiplexed (TDM) signal using the carrier frequency $f'_1$ and appears at a corresponding one of N' output ports, $419_1$ through $419_{N'}$.

As discussed above, FIG. 6 is a functional representation of one of the TMW switches $417_1$ through $417_{F'}$. The switch shown in FIG. 6, however, may also be a suitable embodiment of each of the switches $417_1$ through $417_{F'}$. Each of the space division switches, $603_1$ through $603_T$, may then comprise, for example, a plurality of $LiNbO_3$, spatial switching elements interconnected as a multi-stage network. Similarly, each of the time-domain demultiplexers, $601_1$ through $601_N$, may be implemented, for example, by a (1×T) $LiNbO_3$ switch, and each of the time-domain multiplexers, $605_1$ through $605_N$, may be implemented, for example, by using an inverse of one of the demultiplexers $601_1$ through $601_N$. Although such an embodiment would not reduce the number of space division switches required, it would allow time division multiplexed signals to be used in the system, as described above.

With respect to FIG. 4, each of the output ports from each of the TMS switches, $417_1$ through $417_F$, is coupled optically to one of an array of N' optical signal wavelength-domain multiplexers, $425_1$ through $425_{N'}$. In particular, each of the multiplexers, $425_1$ through $425_{N'}$, is coupled to a respective one of the N' output ports from each of the TMS switches, $417_1$ through $417_F$, as shown in FIG. 4. Each of the optical multiplexers, $425_1$ through $425_{N'}$, may thus receive an optical signal from each of the TMS switches, $417_1$ through $417_F$. As further shown in FIG. 4, the output of each of the multiplexers, $425_1$ through $425_{N'}$, would be a WDM/TDM signal which may be transmitted along a corresponding one of N' optical links, $427_1$ through $427_{N'}$. The different components of the wavelength router/switch of FIG. 4 may be optically coupled, for example, by optical fibers or by any other suitable optical links.

Figure 7:
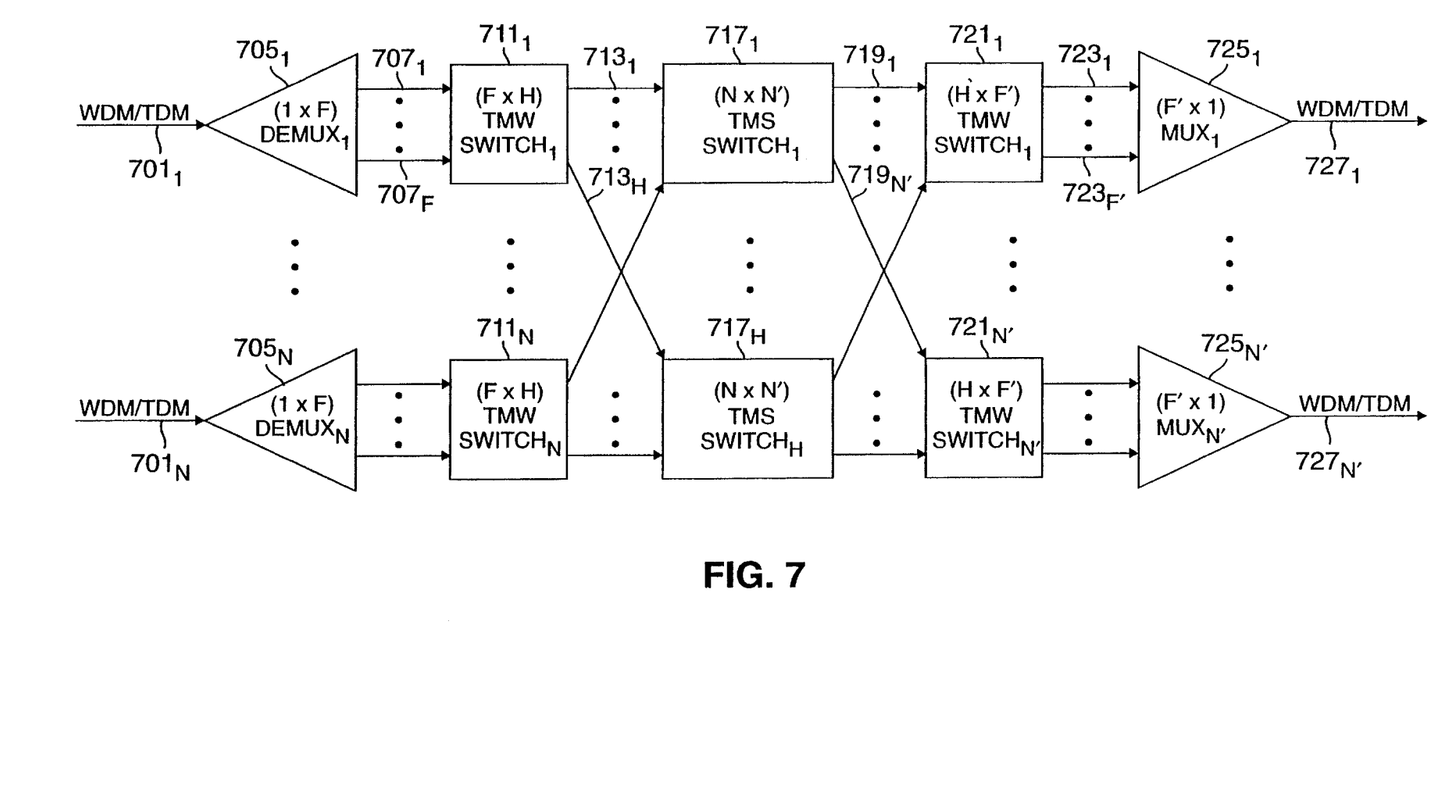
FIG. 7 is a block diagram showing yet a further embodiment of a wavelength router/switch according to the principles of the present invention.

FIG. 7 is a block diagram showing yet a further embodiment of an optical signal wavelength router/switch according to the principles of the present invention. This embodiment is similar to the embodiment shown in FIG. 4, with the addition of a second array of TMW switches connected between the array of TMS switches and the array of optical signal wavelength-domain multiplexers. The addition of the second array of TMW switches may be necessary to meet the channel ordering requirements of the optical system.

Specifically, with reference to FIG. 7, the wavelength router/switch may include an array of optical links, $701_1$ through $701_N$, each of which may suitably carry a WDM/TDM signal and which is coupled optically to a respective one of an array of N optical signal wavelength-domain demultiplexers, $705_1$ through $705_N$. The optical link $701_1$, for example, is coupled to the wavelength-domain demultiplexer $705_1$. Each of the demultiplexers, $705_1$ through $705_N$, preferably splits the WDM/TDM signal received at its input into the respective frequency or wavelength components of the WDM/TDM signal and includes F output ports. The demultiplexer $705_1$, for example, includes F output ports, $707_1$ through $707_F$, each of which corresponds to one of F demultiplexed carrier frequencies.

The wavelength router/switch of FIG. 7 also includes an array of N optical signal TMW switches, $711_1$ through $711_N$, corresponding to the array of demultiplexers, $705_1$ through $705_N$. The outputs of each of the demultiplexers, $705_1$ through $705_N$, are coupled optically and serve as inputs to a corresponding one of N TMW switches, $711_1$ through $711_N$. For this purpose, each of the TMW switches, $711_1$ through $711_N$, is coupled to a respective set of F outputs from one of the demultiplexers, $705_1$ through $705_N$. Thus, for example, the outputs ports, $707_1$ through $707_F$, of the demultiplexer $705_1$ are coupled to the TMW switch $711_1$ as shown in FIG. 7. Each of the TMW switches, $711_1$ through $711_N$, is functionally equivalent to and may be implemented in the same manner as the TMW switch $411_1$ shown in FIG. 5 with H replacing F'. Each of the TMW switches, $711_1$ through $711_N$, thus has H output ports. The TMW switch $711_1$, for example, includes H output ports, $713_1$ through $713_H$, each of which corresponds to one of H shifted carrier frequencies.

The wavelength router/switch of FIG. 7 further includes an array of H TMS switches, $717_1$ through $717_H$. Each of the TMS switches, $717_1$ through $717_H$, preferably is coupled optically to a respective one of the outputs from each of the TMW switches, $711_1$ through $711_N$. More specifically, the outputs from the TMW switches, $711_1$ through $711_N$, that are using a common one of the H carrier frequencies or carrier wavelengths, preferably are coupled to the same one of the TMS switches, $717_1$ through $717_H$. Each of the TMS switches, $717_1$ through $717_H$, may be implemented in the same manner as the TMS switch $417_1$ shown in FIG. 6. Then each of the TMS switches, $717_1$ through $717_H$, would preferably route each of the input signals it receives to a respective one of N' output ports. The TMS switch $717_1$, for example, routes each optical signal it receives to a respective one of N' output ports, $719_1$ through $719_{N'}$.

Each of the N' output ports from each of the TMS switches, $717_1$ through $717_H$, preferably is coupled optically to one of a second array of TMW switches, $721_1$ through $721_{N'}$. In particular, each of the wavelength switches, $721_1$ through $721_{N'}$, is coupled to a respective one of the N' outputs from each of the TMS switches, $717_1$ through $717_H$. Thus, each of the TMW switches, $721_1$ through $721_{N'}$, may receive an optical signal from each of the TMS switches, $717_1$ through $717_H$.

Each of the TMW switches, $721_1$ through $721_{N'}$, may be implemented in the same manner as the TMW switch $411_1$ shown in FIG. 5, with F replaced by H. The TMW switch $721_1$, for example, includes F' output ports, $723_1$ through $723_{F'}$, each of which corresponds to one of F' shifted carrier frequencies. Each of the F' outputs from any one of the TMW switches, $721_1$ through $721_{N'}$, preferably is coupled optically to the same respective one of an array of N' optical signal wavelength-domain multiplexers, $725_1$ through $725_{N'}$. Thus, for example, the output ports $723_1$ through $723_{F'}$, are coupled to the multiplexer $725_1$. Each of the multiplexers, $725_1$ through $725_{N'}$, may receive a TDM signal in each of the F' carrier frequencies. The output of each of the multiplexers, $725_1$ through $725_{N'}$, would be a WDM/TDM signal and may be transmitted along a corresponding one of N' optical links, $727_1$ through $727_{N'}$. As indicated above, the addition of the second array of TMW switches, $721_1$ through $721_{N'}$, allows the carrier frequencies to be shifted or switched to meet the channel ordering requirements of the optical system.

The respective arrays of space switches in FIGS. 1, 3, and 6 may be replaced by single space division switches whose crosspoint settings are selected separately for different wavelengths. In addition, time division switches or time slot interchangers may be included in the system to provide a further increase in connectivity and an improvement in switch performance. Furthermore, although the general situation has been discussed in which the various wavelength, space, TMW and TMS switches may be asymmetric, it should be understood that symmetric switches, which have the same number of outputs as inputs, may also be used.

It will be appreciated that, although the present invention has been described with reference to specific embodiments, other arrangements within the spirit and scope of the present invention will be readily apparent to persons of ordinary skill in the art. The present invention is, therefore, limited only by the appended claims.

We claim:

1. A combined optical signal wavelength router and switch apparatus comprising;

an array of N optical signal wavelength-domain demultiplexers each of which includes an input and a set of F output ports;

an array of N optical signal wavelength division switches, each of which is coupled optically to a respective one of said sets of F output ports and each of which includes a set of F' output ports, wherein each of the optical signal wavelength division switches in said array of N optical signal wavelength division switches comprises:

(i) an array of F optical signal wavelength converters each of which includes an output, (ii) an optical signal combiner coupled optically to the output of each of said F optical signal wavelength converters, and (iii) an optical signal wavelength-domain demultiplexer coupled optically to said optical signal combiner;

an array of F' optical signal space division switches, each of which is coupled optically to respective one of said F' output ports from each of said N optical signal wavelength division switches, and each of which includes a set of N' output ports; and an array of N' optical signal wavelength-domain multiplexers, each of which is coupled optically to a respective one of said set of N' output ports from each of said F' optical signal space division switches, and each of which includes an output.

2. A combined optical signal wavelength router and switch apparatus comprising:

an array of N optical signal wavelength-domain demultiplexers each of which includes an input and a set of F output ports;

an array of N optical signal wavelength division switches, each of which is coupled optically to a respective one of said sets of F output ports and each of which includes a set of F' output ports;

an array of F' optical signal space division switches, each of which is coupled optically to a respective one of said F' output ports from each of said N optical signal wavelength division switches, and each of which includes a set of N' output ports; and an array of N' optical signal wavelength-domain multiplexers, each of which is coupled optically to a respective one of said set of N' output ports from each of said F' optical signal space division switches, and each of which includes an output, wherein, F' is greater than F and N' is greater than N.

3. The combined optical signal wavelength router and switch apparatus of claim 1 wherein each of the optical signal space division switches in said F' optical signal space division switches comprises a plurality of lithium niobate spatial switching elements.

4. The combined optical signal wavelength router and switch apparatus of claim 1 wherein said array of F' optical signal space division switches comprises a single space division switch whose crosspoint settings are selected separately for different wavelengths.

5. The combined optical signal wavelength router and switch apparatus of claim 1 wherein each of said N' optical signal wavelength-domain multiplexers comprises an optical signal star coupler.

6. A combined optical signal wavelength router and switch apparatus comprising:

an array of N optical signal wavelength-domain demultiplexers each of which includes an input and a set of F output ports;

an array of N optical signal wavelength division switches, each of which is coupled optically to a respective one of said sets of F output ports and each of which includes a set of H output ports;

an array of H optical signal space division switches, each of which is coupled optically to a respective one of said H output ports from each of said N optical signal wavelength division switches, and each of which includes a set of N' output ports;

an array of N' optical signal wavelength division switches, each of which is coupled optically to a respective one of said set of N' output ports from each of said H optical signal space division switches, and each of which includes a set of F' output ports; and an array of N' optical signal wavelength-domain multiplexers, each of which is coupled optically to a respective one of said set of F' output ports, each of which includes an output, wherein, H is equal to or greater than (F+F'−1).

7. The combined optical signal wavelength router and switch apparatus of claim 6 wherein each of the optical signal space division switches in said array of H optical signal space division switches comprises a plurality of lithium niobate spatial switching elements.

8. The combined optical signal wavelength router and switch apparatus of claim 6 wherein said array of H optical signal space division switches comprises a single space division switch whose crosspoint settings are selected separately for different wavelengths.

9. The combined optical signal wavelength router and switch apparatus of claim 6 wherein each of the optical signal wavelength-domain multiplexers in said array of N' optical signal wavelength-domain multiplexers comprises an optical signal star coupler.

10. A combined optical signal wavelength router and switch apparatus comprising:

an array of N optical signal wavelength-domain demultiplexers each of which includes an input and a set of F output ports;

an array of N optical signal wavelength division switches, each of which is coupled optically to a respective one of said sets of F output ports and each of which includes a set of H output ports, wherein each of the optical signal wavelength division switches in said array of N optical signal wavelength division switches comprises:

(i) an array of F optical signal wavelength converters each of which includes an output, (ii) an optical signal combiner coupled optically to the output of each of said F optical signal wavelength converters, and (iii) an optical signal wavelength-domain demultiplexer coupled optically to said optical signal combiner;

an array of H optical signal space division switches, each of which is coupled optically to a respective one of said H output ports from each of said N optical signal wavelength division switches, and each of which includes a set of N' output ports;

an array of N' optical signal wavelength division switches, each of which is coupled optically to a respective one of said set of N' output ports from each of said H optical signal space division switches, and each of which includes a set of F' output ports; and an array of N' optical signal wavelength-domain multiplexers, each of which is coupled optically to a respective one of said set of F' output ports, each of which includes an output.

11. A combined optical signal wavelength router and switch apparatus comprising:

an array of N optical signal wavelength-domain demultiplexers each of which includes an input and a set of F output ports;

an array of N optical signal wavelength division switches, each of which is coupled optically to a respective one of said sets of F output ports and each of which includes a set of H output ports;

an array of H optical signal space division switches, each of which is coupled optically to a respective one of said H output ports from each of said N optical signal wavelength division switches, and each of which includes a set of N' output ports;

an array of N' optical signal wavelength division switches, each of which is coupled optically to a respective one of said set of N' output ports from each of said H optical signal space division switches, and each of which includes a set of F' output ports, wherein each of the optical signal wavelength division switches in said array of N' optical signal wavelength division switches comprises:

(i) an array of H optical signal wavelength converters each of which includes an output, (ii) an optical signal combiner coupled optically to the output of each of said H optical signal wavelength converters, and (iii) an optical signal wavelength-domain demultiplexer coupled optically to said optical signal combiner; and an array of N' optical signal wavelength-domain multiplexers, each of which is coupled optically to a respective one of said set of F' output ports, and each of which includes an output.

12. A combined optical signal wavelength router and switch apparatus comprising:

an array of N optical signal wavelength-domain demultiplexers each of which demultiplexers includes an input and a set of F output ports;

an array of N optical signal time-multiplexed (TMW) switches, each of which TMW switches is coupled optically to a respective one of said sets of F output ports and each of which includes a set of F' output ports;

an array of F' optical signal space time-multiplexed space division (TMS) switches, each of which TMS switches is coupled optically to a respective one of said F' output ports from each of said N optical signal time-multiplexed wavelength division (TMW) switches, and each of which includes a set of N' output ports; and an array of N' optical signal wavelength-domain multiplexers, each of which is coupled optically to a respective one of said set of N' output ports from each of said F' optical signal time-multiplexed space division (TMS) switches, and each of which includes an output, wherein, F' is greater than F and N' is greater than N.

13. The combined optical signal wavelength router and switch apparatus of claim 12 wherein each of the optical signal wavelength-domain multiplexers in said array of N' optical signal wavelength-domain multiplexers comprises an optical signal star coupler.

14. A combined optical signal wavelength router and switch apparatus comprising:

an array of N optical signal wavelength-domain demultiplexers each of which includes an input and a set of F output ports;

an array of N optical signal time-multiplexed wavelength division (TMW) switches, each of which TMW switches is coupled optically to a respective one of the sets of F output ports and each of which includes a set of F' output ports, wherein each of the optical signal time-multiplexed wavelength division (TMW) switches in said array of N optical signal time-multiplexed wavelength division switches comprises:

(i) an array of F optical signal time-domain demultiplexers each of which includes a set of T output ports, (ii) an array of T optical signal wavelength division switches each of which is coupled optically to a respective one of said set of T output ports from each of said F optical signal time-domain demultiplexers, and each of which includes a set of F' output ports, and (iii) an array of F' optical signal time-domain multiplexers, each of which is coupled optically to a respective one of said set of F output ports from each of said T optical signal wavelength division switches, and each of which includes an output;

an array of F' optical signal time-multiplexed space division (TMS) switches, each of which TMS switches is coupled optically to a respective one of the F' output ports from each of the N TMW switches, and each of which includes a set of N' output ports; and an array of N' optical signal wavelength-domain multiplexers, each of which is coupled optically to a respective one of said set of N' output ports from each of said F' TMS switches, and each of which includes an output.

15. The combined optical signal wavelength router and switch apparatus of claim 14 wherein each of the optical signal wavelength division switches in said array of T optical signal wavelength division switches comprises:

an array of F optical signal wavelength converters each of which includes an output;

an optical signal combiner coupled optically to the output of each of said F optical signal wavelength converters; and an optical signal wavelength-domain demultiplexer coupled optically to said optical signal combiner.

16. A combined optical signal wavelength router and switch apparatus comprising:

an array of N optical signal wavelength-domain demultiplexers each of which includes an input and a set of F output ports;

an array of N optical signal time-multiplexed wavelength division (TMW) switches, each of which TMW switches is coupled optically to a respective one of the sets of F output ports and each of which includes a set of F' output ports;

an array of F' optical signal time-multiplexed space division (TMS) switches, each of which TMS switches is coupled optically to a respective one of the F' output ports from each of the N TMW switches, and each of which includes a set of N' output ports, wherein each of the optical signal time-multiplexed space division (TMS) switches in said array of F optical signal time-multiplexed space division (TMS) switches comprises:

(i) an array of N optical signal time-domain demultiplexers each of which includes a set of T output ports, (ii) an array of T optical signal space division switches each of which is coupled optically to a respective one of said set of T output ports from each of said N optical signal time-domain demultiplexers, and each of which includes a set of N' output ports, and (iii) an array of N' optical signal time-domain multiplexers, each of which is coupled optically to a respective one of said set of N' output ports from each of said T optical signal space division switches, and each of which includes an output; and an array of N' optical signal wavelength-domain multiplexers, each of which is coupled optically to a respective one of said set of N' output ports from each of said F' TMS switches, and each of which includes an output.

17. The combined optical signal wavelength router and switch apparatus of claim 16 wherein each of the optical signal space division switches in said array of T optical signal space division switches comprises a plurality of lithium niobate spatial switching elements.

18. The combined optical signal wavelength router and switch apparatus of claim 16 wherein said array of T optical signal space division switches comprises a single space division switch whose crosspoint settings are selected separately for different wavelengths.

19. A combined optical signal wavelength router and switch apparatus comprising:

an array of N optical signal wavelength-domain demultiplexers each of which includes an input and a set of F output ports;

an array of N optical signal time-multiplexed wavelength division (TMW) switches, each of which is coupled optically to a respective one of said sets of F output ports and each of which includes a set of H output ports;

an array of H optical signal time-multiplexed space division (TMS) switches, each of which is coupled optically to a respective one of said H output ports from each of said N optical signal time-multiplexed wavelength division (TMW) switches, and each of which includes a set of N' output ports;

an array of N' optical signal time-multiplexed wavelength division (TMW) switches, each of which is coupled optically to a respective one of said set of N' output ports from each of said H optical signal time-multiplexed space division (TMS) switches, and each of which includes a set of F' output ports; and an array of N' optical signal wavelength-domain multiplexers, each of which is coupled optically to a respective one of said set of F' output ports, each of which includes an output, wherein, H is equal to or greater than (F+F'−1).

20. The combined optical signal wavelength router and switch apparatus of claim 19 wherein each of said N' optical signal wavelength-domain multiplexers comprises an optical signal star coupler.

21. A combined optical signal wavelength router and switch apparatus comprising:

an array of N optical signal wavelength-domain demultiplexers each of which includes an input and a set of F output ports;

an array of N optical signal time-multiplexed wavelength division (TMW) switches, each of which is coupled optically to a respective one of said sets of F output ports and each of which includes a set of H output ports, wherein each of the optical signal time-multiplexed wavelength division (TMW) switches in said array of N optical signal time-multiplexed wavelength division (TMW) switches comprises:

(i) an array of F optical signal time-domain demultiplexers each of which includes a set of T output ports, (ii) an array of T optical signal wavelength division switches each of which is coupled optically to a respective one of said set of T output ports from each of said F optical signal time-domain demultiplexers, and each of which includes a set of H output ports, and (iii) an array of H optical signal time-domain multiplexers, each of which is coupled optically to a respective one of said set of H output ports from each of said T optical signal wavelength division switches, and each of which includes an output;

an array of H optical signal time-multiplexed space division (TMS) switches, each of which is coupled optically to a respective one of said H output ports from each of said N optical signal time-multiplexed wavelength division (TMW) switches, and each of which includes a set of N' output ports;

an array of N' optical signal time-multiplexed wavelength division (TMW) switches, each of which is coupled optically to a respective one of said set of N' output ports from each of said H optical signal time-multiplexed space division switches, and each of which includes a set of F' output ports; and an array of N' optical signal wavelength-domain multiplexers, each of which is coupled optically to a respective one of said set of F' output ports, each of which includes an output.

22. The combined optical signal wavelength router and switch apparatus of claim 21 wherein each of the optical signal wavelength division switches in said array of T optical signal wavelength division switches comprises:

an array of F optical signal wavelength converters each of which includes an output;

an optical signal combiner coupled optically to the output of each of said F optical signal wavelength converters; and an optical signal wavelength-domain demultiplexer coupled to said optical signal combiner.

23. A combined optical signal wavelength router and switch apparatus comprising:

an array of N optical signal wavelength-domain demultiplexers each of which includes an input and a set of F output ports;

an array of N optical signal time-multiplexed wavelength division (TMW) switches, each of which is coupled optically to a respective one of said sets of F output ports and each of which includes a set of H output ports;

an array of H optical signal time-multiplexed space division (TMS) switches, each of which is coupled optically to a respective one of said H output ports from each of said N optical signal time-multiplexed wavelength division (TMW) switches, and each of which includes a set of N' output ports;

an array of N' optical signal time-multiplexed wavelength division (TMW) switches, each of which is coupled optically to a respective one of said set of N' output ports from each of said H optical signal time-multiplexed space division switches, and each of which includes a set of F' output ports, wherein each of the optical signal time-multiplexed wavelength division (TMW) switches in said array of N' optical signal time-multiplexed wavelength division (TMW) switches comprises:

(i) an array of H optical signal time-domain demultiplexers each of which includes a set of T output ports, (ii) an array of T optical signal wavelength division switches each of which is coupled optically to a respective one of said set of T output ports from each of said H optical signal time-domain demultiplexers, and each of which includes a set of F' output ports, and (iii) an array of F' optical signal time-domain multiplexers, each of which is coupled optically to a respective one of said set of F' output ports from each of said T optical signal wavelength division switches, and each of which includes an output;

an array of N' optical signal wavelength-domain multiplexers, each of which is coupled optically to a respective one of said set of F' output ports, each of which includes an output.

24. The combined optical signal wavelength router and switch apparatus of claim 23 wherein each of the optical signal wavelength division switches in said array of T optical signal wavelength division switches comprises:

an array of H optical signal wavelength converters each of which includes an output;

an optical signal combiner coupled optically to the output of each of said H optical signal wavelength converters; and an optical signal wavelength-domain demultiplexer coupled to said optical signal combiner.

25. A combined optical signal wavelength router and switch apparatus comprising:

an array of N optical signal wavelength-domain demultiplexers each of which includes an input and a set of F output ports:

an array of N optical signal time-multiplexed wavelength division (TMW) switches, each of which is coupled optically to a respective one of said sets of F output ports and each of which includes a set of H output ports;

an array of H optical signal time-multiplexed space division (TMS) switches, each of which is coupled optically to a respective one of said H output ports from each of said N optical signal time-multiplexed wavelength division (TMW) switches, and each of which includes a set of N' output ports, wherein each of the optical signal time multiplexed space division (TMS) switches in said array of H optical signal time-multiplexed space division (TMS) switches comprises:

(i) an array of N optical signal time-domain demultiplexers each of which includes a set of T output ports, (ii) an array of T optical signal space division switches each of which is coupled optically to a respective one of said set of T output ports from each of said N optical signal time-domain demultiplexers, and each of which includes a set of N' output ports, and (iii) an array of N' optical signal time-domain multiplexers, each of which is coupled optically to a respective one of said set of N' output ports from each of said T optical signal space division switches, and each of which includes an output;

an array of N' optical signal time-multiplexed wavelength division (TMV) switches, each of which is coupled optically to a respective one of said set of N' output ports from each of said H optical signal time-multiplexed space division switches, and each of which includes a set of F' output ports;

an array of N' optical signal wavelength-domain multiplexers, each of which is coupled optically to a respective one of said set of F' output ports, each of which includes an output.

26. The combined optical signal wavelength router and switch apparatus of claim 25 wherein each of the optical signal space division switches in said array of T optical signal space division switches comprises a plurality of lithium niobate spatial switching elements.

27. The combined optical signal wavelength router and switch apparatus of claim 25 wherein said array of T optical signal space division switches comprises a single space division switch whose crosspoint settings are selected separately for different wavelengths.

28. An optical signal wavelength division switch comprising:

an array of F optical signal wavelength converters each of which includes an output;

an optical signal combiner coupled optically to the output of each of said F optical signal wavelength converters; and an optical signal wavelength-domain demultiplexer coupled optically to said optical signal combiner, wherein the demultiplexer has a set of F' output ports and wherein F' is greater than F.

29. An optical signal time-multiplexed wavelength division switch comprising:

an array of F optical signal time-domain demultiplexers each of which includes a set of T output ports;

an array of T optical signal wavelength division switches each of which is optically coupled to a respective one of said set of T output ports from each of said F optical signal time-domain demultiplexers, and each of which includes a set of F' output ports; and an array of F' optical signal time-domain multiplexers, each of which is coupled optically to a respective one of said set of F' output ports from each of said T optical signal wavelength division switches, and each of which includes an output, wherein, F' is greater than F.

30. An optical signal time-multiplexed wavelength division switch comprising:

an array of F optical signal time-domain demultiplexers each of which includes a set of T output ports;

an array of T optical signal wavelength division switches each of which is optically coupled to a respective one of said set of T output ports from each of said F optical signal time-domain demultiplexers, and each of which includes a set of F' output ports, wherein each of the optical signal wavelength division switches in the array further comprise:

(i) an array of F optical signal wavelength converters each of which includes an output, (ii) an optical signal combiner coupled optically to the output of each of said F optical signal wavelength converters, and (iii) an optical signal wavelength-domain demultiplexer coupled optically to said optical signal combiner; and an array of F' optical signal time-domain multiplexers, each of which is coupled optically to a respective one of said set of F' output ports from each of said T optical signal wavelength division switches, and each of which includes an output.

31. An optical signal time-multiplexed space division switch comprising:

an array of N optical signal time-domain demultiplexers each of which includes a set of T output ports;

an array of T optical signal space switches each of which is optically coupled to a respective one of said set of T output ports from each of said N optical signal time-domain demultiplexers, and each of which includes a set of N' output ports; and an array of N' optical signal time-domain multiplexers, each of which is coupled optically to a respective one of said set of N' output ports from each of said T optical signal space division switches, and each of which includes an output, wherein, N' is greater than N.

* * * * *